(12) United States Patent
Pei

(10) Patent No.: US 11,779,115 B2
(45) Date of Patent: Oct. 10, 2023

(54) DISPLAY MOUNTING APPARATUS

(71) Applicant: Shenzhen Xinadda Ir-Pi Products Co., Ltd., Shenzhen (CN)

(72) Inventor: Xubo Pei, Shenzhen (CN)

(73) Assignee: Shenzhen Xinadda Ir-Pi Products Co., Ltd., Shenzhen (CN)

( * ) Notice: Subject to any disclaimer, the term of this patent is extended or adjusted under 35 U.S.C. 154(b) by 102 days.

(21) Appl. No.: 17/538,448

(22) Filed: Nov. 30, 2021

(65) Prior Publication Data
US 2023/0165368 A1 Jun. 1, 2023

(51) Int. Cl.
*A47B 97/00* (2006.01)
*F16M 11/10* (2006.01)
*F16M 11/20* (2006.01)

(52) U.S. Cl.
CPC ............ *A47B 97/001* (2013.01); *F16M 11/10* (2013.01); *F16M 11/2014* (2013.01); *F16M 11/2085* (2013.01); *F16M 11/2092* (2013.01)

(58) Field of Classification Search
CPC ............. A47B 97/001; F16M 11/2092; F16M 11/2085; F16M 11/048; F16M 11/2014; F16M 11/10; F16M 2200/061; F16M 2200/063; F16M 13/02
USPC ............................... 248/277.1, 919, 921–923
See application file for complete search history.

(56) References Cited

U.S. PATENT DOCUMENTS

| | | | | |
|---|---|---|---|---|
| 8,693,172 B2 * | 4/2014 | Russell | .............. | F16M 11/2085 361/679.01 |
| D852,790 S * | 7/2019 | Pei | .............................. | D14/239 |
| 2003/0222041 A1* | 12/2003 | Hong | ..................... | F16M 13/02 211/99 |
| 2005/0051688 A1* | 3/2005 | Dittmer | .................. | F16M 11/38 248/920 |
| 2011/0019344 A1* | 1/2011 | Russell | .............. | F16M 11/2085 361/679.01 |
| 2013/0187019 A1* | 7/2013 | Dittmer | .............. | F16M 11/2085 248/277.1 |
| 2019/0390817 A1* | 12/2019 | Pei | ......... | F16M 11/08 |
| 2020/0120305 A1* | 4/2020 | Pei | ......... | F16M 11/04 |
| 2020/0340614 A1* | 10/2020 | Pei | ......... | F16M 11/08 |
| 2021/0010632 A1* | 1/2021 | Pei | ......... | F16M 13/02 |
| 2021/0332936 A1* | 10/2021 | Lyu | ......... | F16M 11/18 |

* cited by examiner

*Primary Examiner* — Ingrid M Weinhold
(74) *Attorney, Agent, or Firm* — IP Spring

(57) ABSTRACT

The present disclosure provides a display mounting apparatus for mounting a display screen on a wall. The display mounting apparatus includes a wall plate, a first adjusting mechanism, a second adjusting mechanism, and a mounting support. A rear end of the first adjusting mechanism is rotatablely coupled on the wall plate. The second adjusting mechanism is rotatably coupled with a front end of the first adjusting mechanism. The second adjusting mechanism is configured to mount the mounting support. The mounting support is configured to mount the display screen. By using the display mounting apparatus, the display screen is closer to the wall, so that the ultra-thin effect of the display screen after installation is better.

19 Claims, 12 Drawing Sheets

DISPLAY MOUNTING APPARATUS

TECHNICAL FIELD

The present disclosure relates to a field of mounting display screens, and in particular to a display mounting apparatus.

BACKGROUND

OLED TVs are popular among consumers for their excellent color display, ultra-thin design, and full screen. However, the existed TV mounting brackets on the market are designed for LED TVs. When the OLED TV is mounted on the wall with the mounting bracket for mounting LED TVs, the ultra-thin effect of the OLED TVs itself is not obvious.

SUMMARY

The present disclosure provides a display mounting apparatus, which is configured to mount a display screen and make the display screen have a good ultra-thin effect after installation, so as to solve the above technical problem.

The present disclosure provides a display mounting apparatus for mounting a display screen on a wall. The display mounting apparatus includes a wall plate, a first adjusting mechanism, a second adjusting mechanism, and a mounting support. A rear end of the first adjusting mechanism is rotatably coupled to the wall plate. The second adjusting mechanism includes a first connecting member, a second connecting member, a connecting plate, and an adjusting member. A side wall of the first connecting member is rotatably coupled with a front end of the first adjusting mechanism. The connecting plate has a mounting wall. A first end of the first connecting member away from the second connecting member and a second end of the second connecting member away from the first connecting member are respectively coupled to the mounting wall. A third end of the first connecting member close to the second connecting member and a fourth end of the second connecting member close to the first connecting member are pivotally coupled. The second connecting member defines a sliding adjustment hole. The second connecting member and the connecting plate are slidably coupled by the adjusting member passing through the sliding adjustment hole and fixed on the mounting wall. The connecting plate is configured to mount the mounting support. The mounting support is configured to mount the display screen.

In the present disclosure, the first connecting member and the second connecting member occupy a space of the mounting wall of the connecting plate, without adding additional installation thickness, making the display mounting apparatus thinner as a whole. Therefore, when the display mounting apparatus is configured to mount the display screen, the display screen is more closer to the wall, and an ultra-thin effect of the display screen after installation is better.

BRIEF DESCRIPTION OF THE ACCOMPANYING DRAWINGS

In order to explain the technical solutions of the embodiments of the present disclosure more clearly, the following will briefly introduce the drawings that need to be used in the embodiments. Obviously, the drawings in the following description are some embodiments of the present disclosure. For those of ordinary skill in the art, other drawings can be obtained from these drawings without creative work.

DETAILED DESCRIPTION OF ILLUSTRATED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, rather than all the embodiments. Based on the embodiments in the present disclosure, all other embodiments obtained by a person of ordinary skill in the art without creative work shall fall within the protection scope of the present disclosure.

Figure 1:
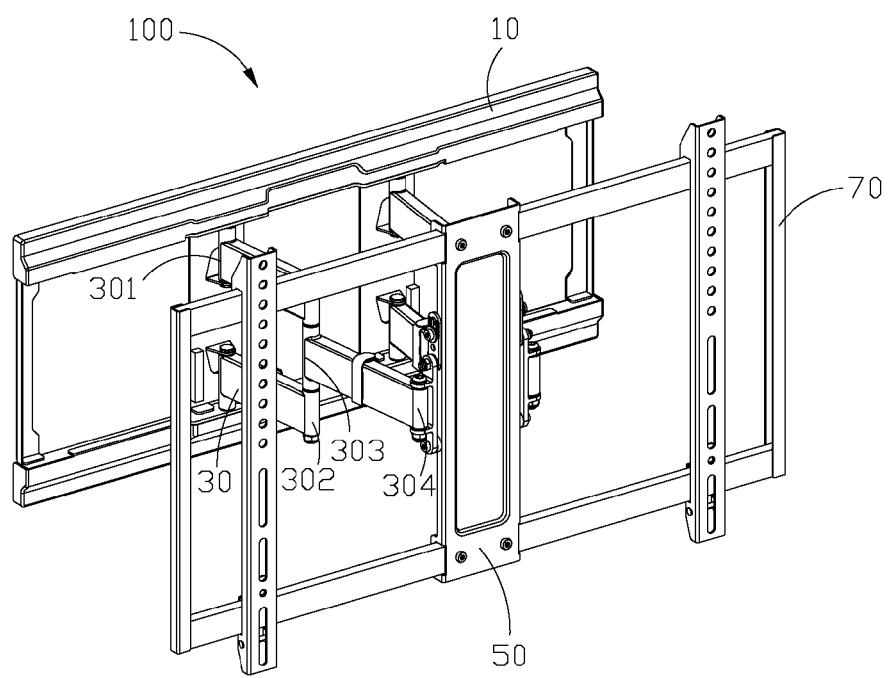
FIG. 1 is a schematic diagram of a three-dimensional structure of a display mounting apparatus provided by one embodiment of the present disclosure.
Figure 2:
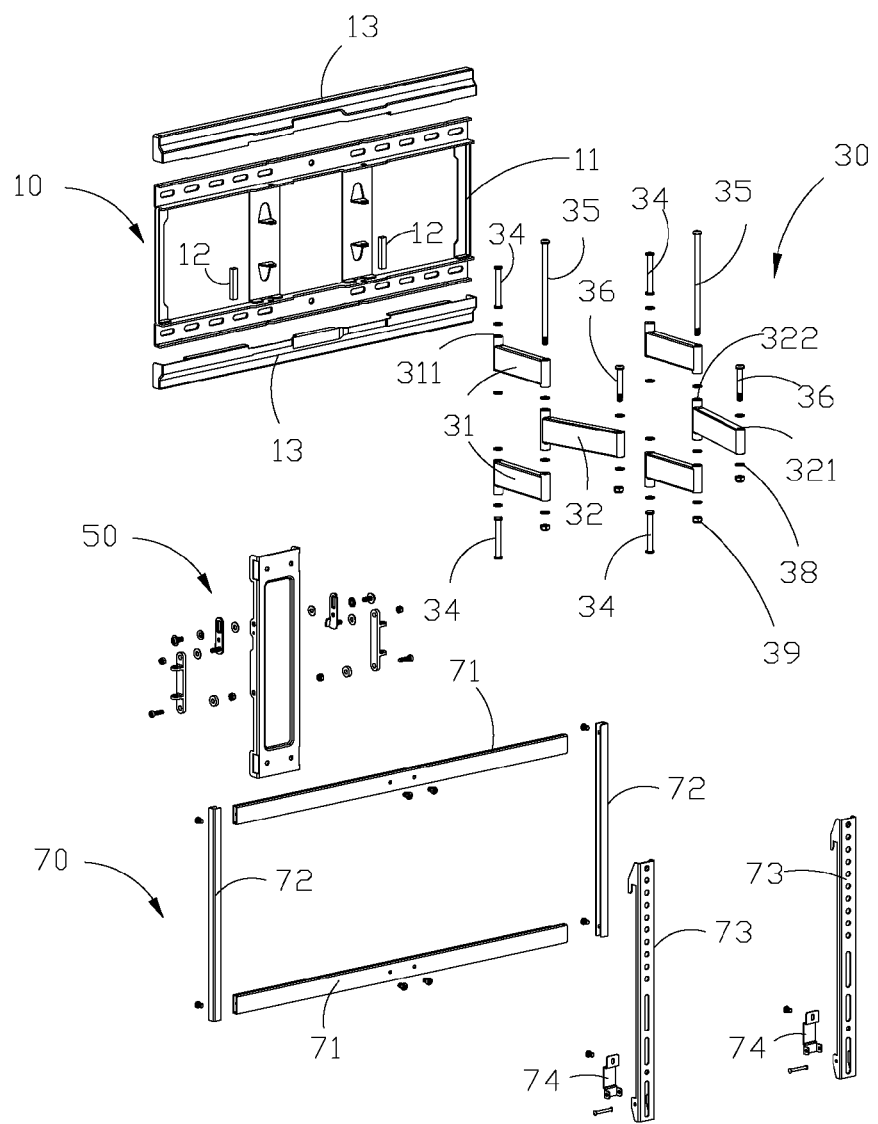
FIG. 2 is an exploded schematic diagram of a three-dimensional structure of the display mounting apparatus of FIG. 1.
Figure 3:
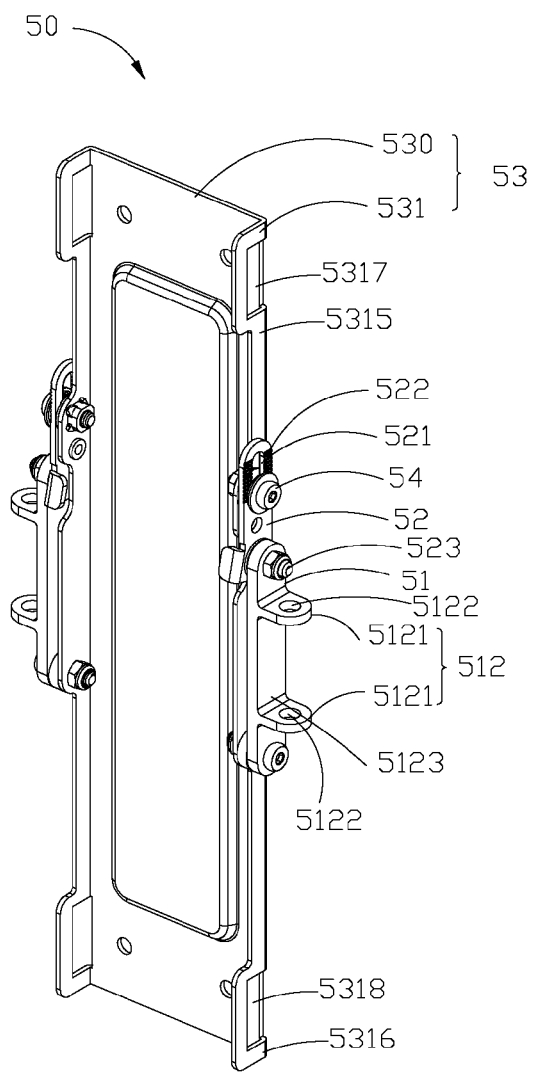
FIG. 3 is a schematic diagram of a second adjusting mechanism of a display mounting apparatus provided by one embodiment of the present disclosure.

Please referring to FIGS. 1 and 2, FIG. 1 is a schematic diagram of a three-dimensional structure of a display mounting apparatus provided by one embodiment of the present disclosure; FIG. 2 is an exploded schematic diagram of a three-dimensional structure of the display mounting apparatus of FIG. 1. The display mounting apparatus 100 is configured to mount a display screen on a wall. The display screen can be but is not limited to flat-panel OLED TVs, flat-panel LED TVs, flat-panel displays, and other electronic devices. In this embodiment, the display screen is a flat-panel OLED TV. In detail, the display mounting apparatus 100 includes a wall plate 10, a first adjusting mechanism 30, a second adjusting mechanism 50, and a mounting support 70. The wall plate 10 is configured to be fixed on the wall. A rear end of the first adjusting mechanism 30 is rotatably coupled to the wall plate 10. A front end of the first adjusting mechanism 30 is rotatably coupled to the second adjusting mechanism 50. The front end of the first adjusting mechanism 30 refers to an end facing away from the wall. The rear end of the first adjusting mechanism 30 refers to an end facing towards the wall. Please referring to FIGS. 3 to 6 together, the second adjusting mechanism 50 includes a first connecting member 51, a second connecting member 52, a connecting plate 53, and an adjusting member 54. A side wall of the first connecting member 51 is rotatably coupled with the front end of the first adjusting mechanism 30. The connecting plate 53 includes a mounting wall 531. A first end 513 of the first connecting member 51 away from the second connecting member 52 and a second end 525 of the second connecting member 52 away from the first connecting member 51 are respectively coupled to the mounting wall 531. A third end 514 of the first connecting member 51 close to the second connecting member 52 and a fourth end 526 of the second connecting member 52 close to the first connecting member 51 are pivotally coupled. The second connecting member 52 defines a sliding adjustment hole 521. The second connecting member 52 and the connecting plate 53 are slidably coupled by the adjusting member 54 passing through the sliding adjustment hole 521 and fixed to the mounting wall 531. The connecting plate 53 is configured for mounting the mounting support 70. The mounting support 70 is configured for mounting a display screen. The first adjusting mechanism 30 is configured to adjust a horizontal rotation angle of the display screen. The second adjusting mechanism 50 is configured to adjust a vertical rotation angle of the display screen. When the vertical rotation angle of the mounting support 70 needs to be adjusted by the second adjusting mechanism 50, the adjusting member 54 is loosened, and then the sliding adjustment hole 521 of the second connecting member 52 is caused to slide relative to the adjusting member 54, which causes a change of a relative positional relationship between the second connecting member 52 and the adjusting member 54, and further causes a change of the relative positional relationship between the first connecting member 51 and the second connecting member 52. Thus, the vertical rotation angle of the mounting support 70 is to be adjusted. The horizontal rotation angle means that when the display screen is mounted on the display mounting apparatus 100, as for the user's angle, the display screen can be pulled to turn left or right to achieve an ideal comfort viewing angle. The vertical rotation angle means that when the display screen is mounted on the display mounting apparatus 100, as for the user's angle, the display screen can be pulled backward or forward to achieve an ideal comfort viewing angle.

Therefore, in the present disclosure, since the first connecting member 51 and the second connecting member 52 are arranged on the mounting wall 531 of the connecting plate 53, they just occupy a space of the mounting wall 531 of the connecting plate 53, and do not increase an additional mounting thickness of the display mounting apparatus 100, so that the display mounting apparatus 100 is thinner overall. Therefore, when the display mounting apparatus 100 is configured to mount the display screen, the display screen is closer to the wall, an ultra-thin effect of the display screen after installation is better. Furthermore, the display mounting apparatus 100 in the present disclosure can adjust the horizontal rotation angle of the display screen through the first adjusting mechanism 30, and adjust the vertical rotation angle through the second adjusting mechanism 50. Therefore, the display screen 50 can be adjusted to any desired angle through the first adjusting mechanism 30 and/or the second adjusting mechanism 50.

Furthermore, in at least one embodiment, the connecting plate 53 includes at least one mounting wall 531 and a plate body 530. The plate body 530 is in a shape of a flat plate. The plate body 530 includes two opposite side edges. The at least one mounting wall 531 each may protrude from one side edge. Or, the at least one mounting wall 531 may protrude from a surface of the plate body 530 close to the first adjusting mechanism 30 and extend at any position parallel to the side edges of the plate body 530. In this embodiment, the plate body 530 is hollow in a middle thereof to facilitate installation and reduce weight and cost of materials. In this embodiment, the number of the at least one mounting wall 531 is two. The two mounting walls 531 respectively extend vertically from the side edges of the plate body 530. In other embodiments, the number of the at least one mounting wall 531 may also be one or more, that is, the one or more mounting walls 531 may protrude from a surface of the plate body 530 close to the first adjusting mechanism 30 and extend vertically or non-vertically at any position parallel to the side edges of the plate body 530.

Figure 6:
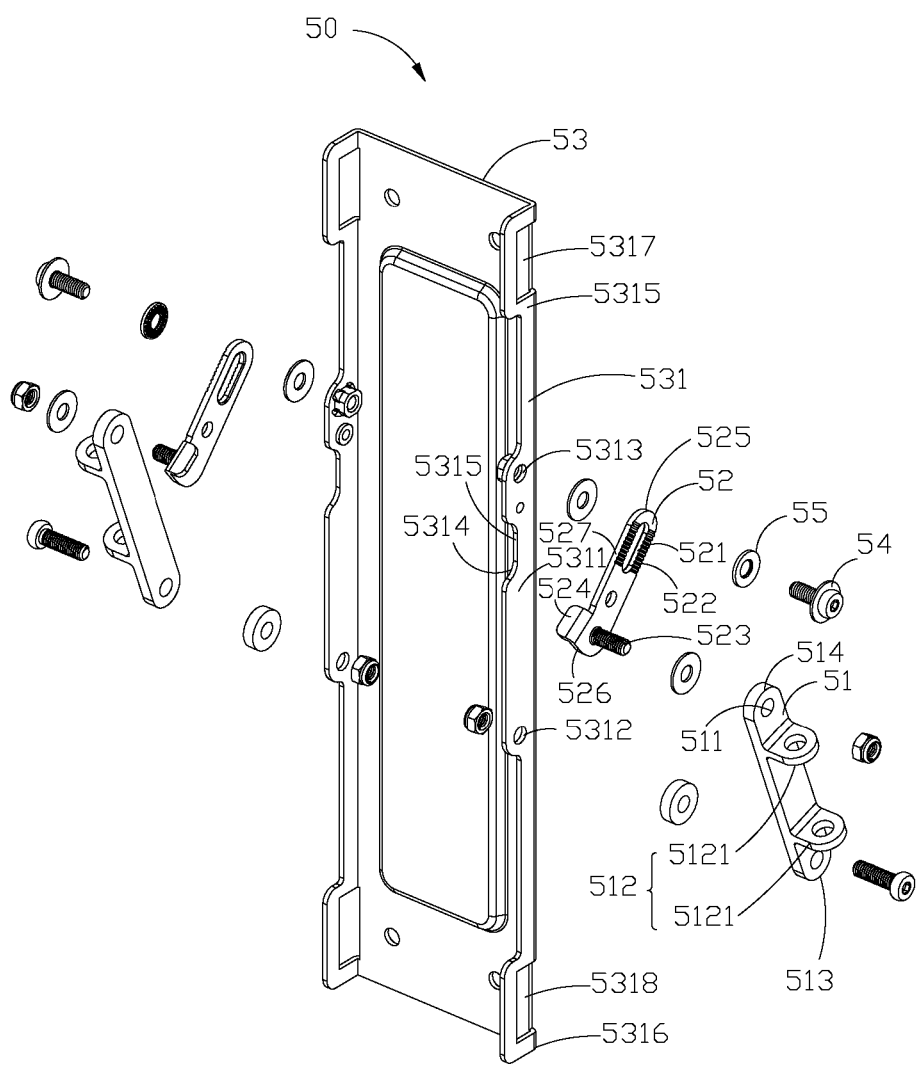
FIG. 6 is an exploded schematic diagram of the second adjusting mechanism of the display mounting apparatus provided by one embodiment of the present disclosure.

Furthermore, in at least one embodiment, referring to FIG. 6, the mounting wall 531 includes a mounting portion 5311 located in a middle thereof. The mounting portion 5311 is configured for mounting the first end 513 of the first connecting member 51 and the second end 525 of the second connecting member 52. Specifically, the mounting portion 5311 defines a first mounting hole 5312 and a second mounting hole 5313. The first mounting hole 5312 is located below the second mounting hole 5313. The first mounting hole 5312 is configured to pivotally connect the first end 513 of the first connecting member 51 away from the second connecting member 52 through a bolt. The adjusting member 54 is a bolt, which passes through the sliding adjustment hole 521 and the second mounting hole 5313 in sequence, and slidably fixes the second end 525 of the second connecting member 52 away from the first connecting member 51 to the mounting portion 5311 of the mounting wall 531.

Therefore, the first connecting member 51 and the second connecting member 52 mainly occupy the space of the mounting wall 531 of the connecting plate 53, without adding additional installation thickness, making the display mounting apparatus 100 thinner overall.

In actual use, after the display screen is fixed and adjusted to an ideal angle by the display mounting apparatus 100, it is not expected that the viewing angle of the display screen will change during use. Therefore, a stable and reliable connection between the second connecting member 52 and the adjusting member 54 are particularly important. Therefore, in order to solve the above problem, the second connecting member 52 is provided with a non-slip strip 522 on at least one side of the two sides of the sliding adjustment hole 521. The sliding adjustment hole 521 extends along a length direction of the second connecting member 52. The non-slip strip 522 is arranged along an extension direction of the sliding adjustment hole 521. When the adjusting member 54 passes through the sliding adjustment hole 521 and is fixedly coupled to the second connecting member 52, a head of the adjusting member 54 abuts the non-slip strip 522, to prevent the second connecting member 52 from moving relative to the adjusting member 54. In order to further prevent unnecessary relative sliding between the second connecting member 52 and the adjusting member 54, a non-slip gasket 55 is also provided between the head of the second connecting member 52 and the adjusting member 54, to further limit the relative sliding between the second connecting member 52 and the adjusting member 54.

Optionally, in at least one embodiment, a screw post 523 is provided on the fourth end 526 of the second connecting member 52 close to the first connecting member 51. One side of the first connecting member 51 close to the second connecting member 52 defines a third mounting hole 511. The screw post 523 passes through the third mounting hole 511 and then is fixed by a nut, so that the third end 514 of the first connecting member 51 and the fourth end 526 of the second connecting member 52 are pivotally coupled. In this embodiment, the screw post 523 and the second connecting member 52 may be made of same materials. It can be understood that, in other embodiments, the screw post 523 and the second connecting member 52 may be detachably coupled.

Optionally, in at least one embodiment, a mounting structure 512 is provided on one side wall of the first connecting member 51. The front end of the first adjusting mechanism 30 is rotatably mounted on the mounting structure 512. Specifically, in this embodiment, the mounting structure 512 includes two mounting lugs 5121 protruding from a side surface of the first connecting member 51. The two mounting lugs 5121 are spaced apart to form a receiving space 5123. Each mounting lug 5121 is provided with a first pivot hole 5122. The front end of the first adjusting mechanism 30 is received in the receiving space 5123, to form a pivot connection with the first pivot holes 5122 of the two mounting lugs 5121. Thus, a stable and reliable connection can be formed between the first connecting member 51 and the first adjusting mechanism 30.

Figure 4:
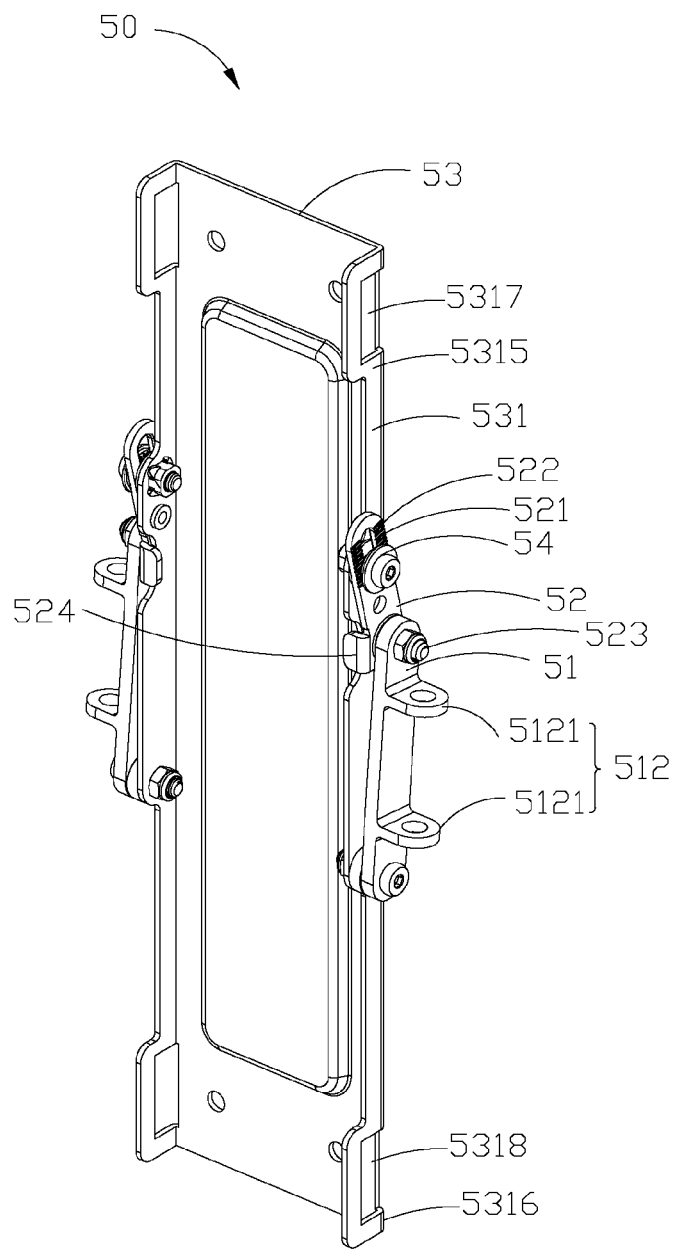
FIG. 4 is a schematic diagram of a first state of the second adjusting mechanism of the display mounting apparatus provided by one embodiment of the present disclosure.
Figure 5:
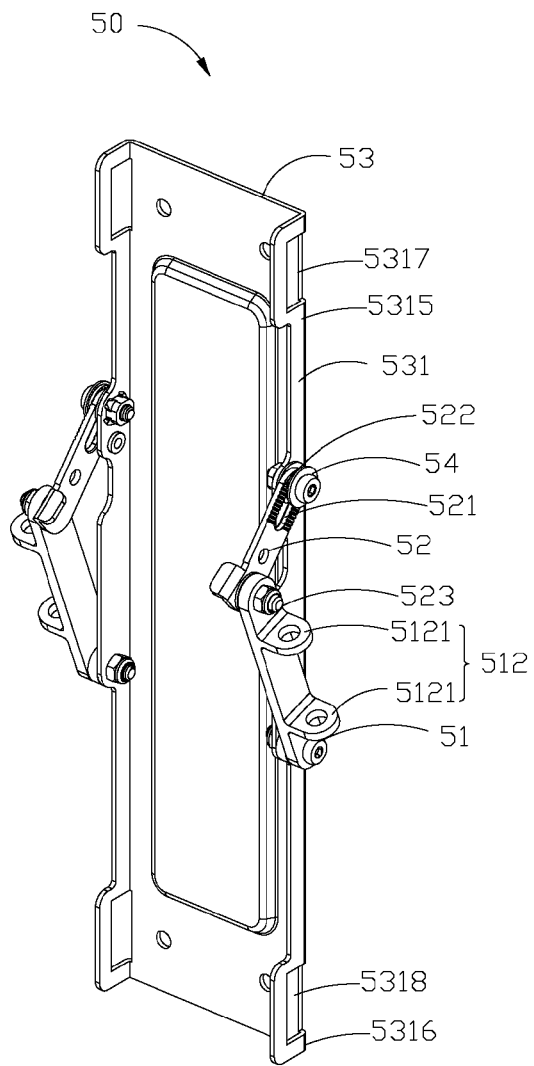
FIG. 5 is a schematic diagram of a second state of the second adjusting mechanism of the display mounting apparatus provided by one embodiment of the present disclosure.

When the display screen is actually used, its vertical rotation angle can be adjusted to achieve a more comfortable feel. However, when the display screen is tilted down too much, it will affect the user's feel. Therefore, in order to avoid excessive downward tilt angle of the display screen, the second connecting member 52 is provided with a limiting member 524. The limiting member 524 is located on the fourth end 526 of the second connecting member 52. The limiting member 524 is further located on one side a first side surface 527 of the second connecting member 52. Specifically, in this embodiment, the limiting member 524 extends vertically from the first side surface 527 of the second connecting member 52 adjacent to the fourth end 526. When the limiting member 524 is capable of resisting on a second side surface 5315 of the mounting portion 5311, the positional relationship between the first connecting member 51 and the second connecting member 52 will be temporarily fixed, that is, the downward tilt angle of the display screen has reached a limit value. In this embodiment, the limit value of the downward tilt angle of the display screen is 5 degrees. The downward tilt angle is an angle between a surface where the plate body 530 of the connecting plate 53 is located and an extending direction of the first connecting member 51. A state where the downward tilt angle of the display screen has reached the limit value is shown in FIG. 4. It can be understood that, in other embodiments, the limit value of the downward tilt angle of the display screen can be adjusted according to actual needs, which is not limited here.

Optionally, in at least one embodiment, in order to adjust the downward tilt angle of the display screen, an avoiding groove 5314 is defined on a position of the mounting portion 5311 corresponding to the limiting member 524. A depth of the avoiding groove 5314 is positively correlated with the downward tilt angle of the display screen. The deeper the depth of the avoiding groove 5314, the greater the downward tilt angle of the display screen. Therefore, the depth of the avoiding groove 5314 can be adjusted according to the size of the downward tilt angle of the display screen.

Furthermore, the display screen can be also tilted up. However, due to a limit of the second adjusting mechanism 50, the display screen cannot be tilted up without limit. In this embodiment, a limit value of an upward tilt angle of the display screen is 20 degrees. It can be understood that, in other embodiments, the limit value of the upward tilt angle of the display screen can be adjusted according to actual needs, which is not limited here.

Optionally, in at least one embodiment, a first connecting portion 5315 and a second connecting portion 5316 are respectively provided on opposite ends of the mounting wall 531. The first connecting portion 5315 and the second connecting portion 5316 are used for connecting with the mounting support 70.

In this embodiment, the first connecting portion 5315 defines a first through hole 5317, and the second connecting portion 5316 defines a second through hole 5318. The first through hole 5317 and the second through hole 5318 are configured to fix the mounting support 70.

Figure 7:
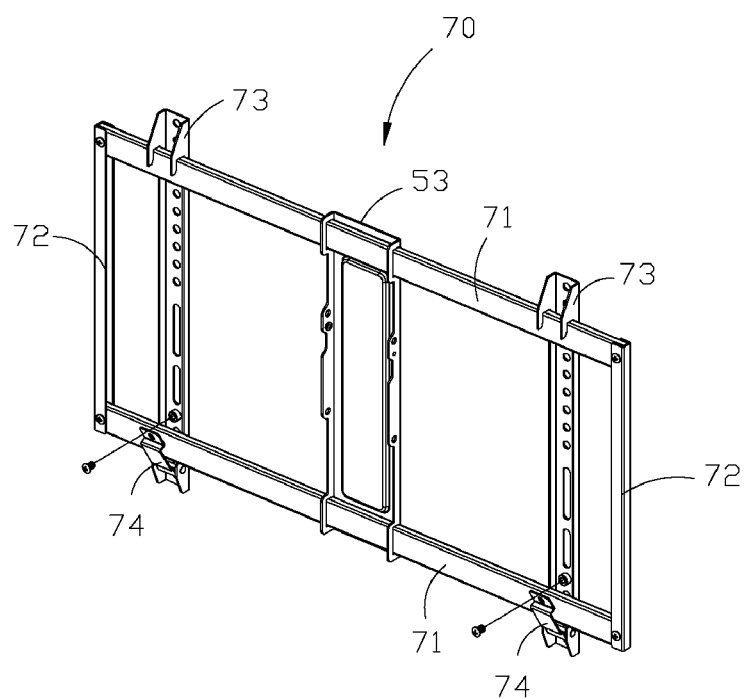
FIG. 7 is a schematic diagram of a first state of a connecting plate and a mounting support of the display mounting apparatus provided by one embodiment of the present disclosure.
Figure 8:
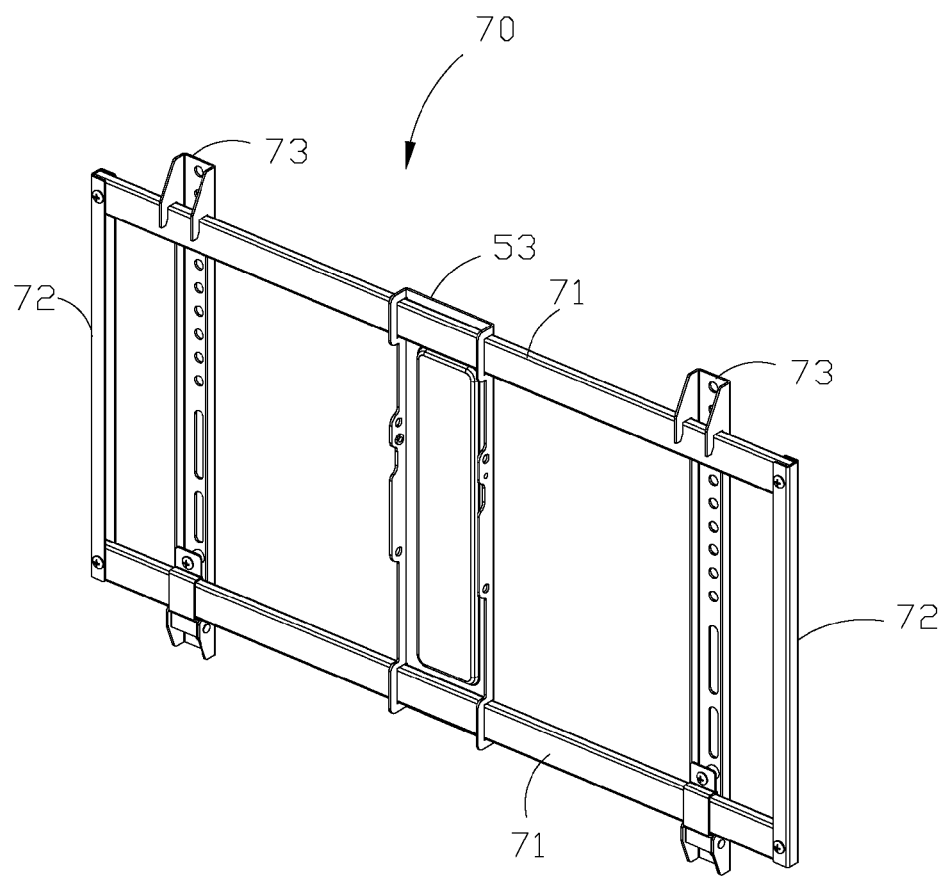
FIG. 8 is a schematic diagram of a second state of the connecting plate and the mounting support of the display mounting apparatus provided by one embodiment of the present disclosure.
Figure 9:
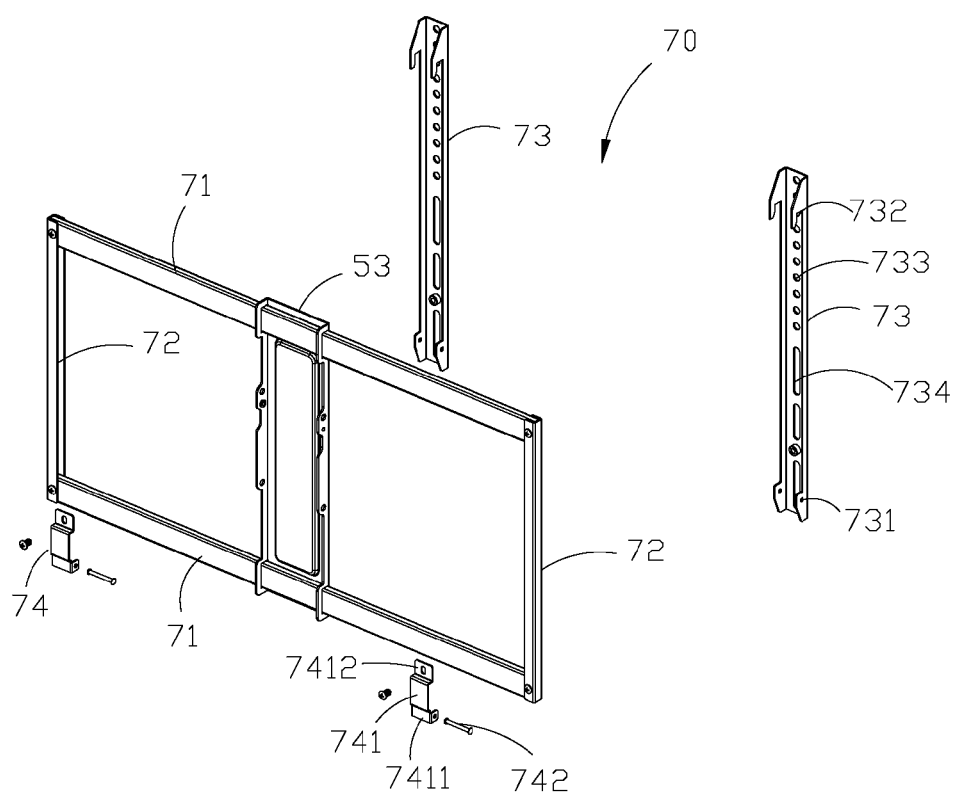
FIG. 9 is an exploded schematic diagram of the connecting plate and the mounting support of the display mounting apparatus provided by one embodiment of the present disclosure.

Furthermore, in at least one embodiment, please referring to FIGS. 7-9, the mounting support 70 includes two connecting rods 71 and two supporting members 72. The two connecting rods 71 and the two supporting members 72 cooperatively form a rectangular frame. An upper connecting rod 71 of the two connecting rods 71 passes through the first through hole 5317. A lower connecting rod 71 of the two connecting rods 71 passes through the second through hole 5318, so that the mounting support 70 is mounted on the connecting plate 53 so as to form the rectangular frame.

Furthermore, in at least one embodiment, the upper connecting rod 71 may be fixed in the corresponding first through hole 5317 by screws. The lower connecting rod 71 may be fixed in the corresponding second through hole 5318 by screws.

Furthermore, in at least one embodiment, the mounting support 70 further includes two hanging rods 73 and two pipe clamps 74. Each hanging rod 73 is provided with a hook 732. The two hanging rods 73 are hung on the upper connecting rod 71 at intervals. Specifically, each hanging rod 73 is hung on the upper connecting rod 71 via the hook 732. Each hanging rod 73 is locked on the lower connecting rod 71 by one pipe clamp 74.

Specifically, the pipe clamp 74 includes a clamp body 741, a third connecting portion 7411 and a fourth connecting portion 7412. The third connecting portion 7411 and the fourth connecting portion 7412 are coupled to opposite ends of the clamp body 741 respectively. The third connecting portion 7411 is approximately U-shaped. The third connecting portion 7411 defines two pivot holes thereon. The fourth connecting portion 7412 is substantially L-shaped. The pipe clamp 74 further includes a pivot shaft 742. One lower end of the hanging rod 73 defines two mounting holes 731. The pivot shaft 742 passes through the two mounting holes 731 of the hanging rod 73 and two pivot holes of the third connecting portion 7411 of the pipe clamp 74, so that pivots the third connecting portion 7411 of the pipe clamp 74 to the lower end of the hanging rod 73. The fourth connecting portion 7412 of the pipe clamp 74 is locked on the hanging rod 73 by screws. Therefore, the hanging rod 73 and the connecting frame can be quickly disassembled and assembled by using the pipe clamp 74, which is convenient for installation.

Furthermore, in at least one embodiment, the hanging rod 73 defines a number of round holes 733 and strip holes 734 for the installation of different sizes and different styles of display screens.

Please referring to FIG. 2 again and FIG. 10 to FIG. 13, the first adjusting mechanism 30 includes at least one pair of main supporting arms 31 and at least one auxiliary supporting arm 32. First rear ends 301 of each pair of main supporting arms 31 away from the auxiliary supporting arm 32 are rotately coupled to the connecting frame 11. First front ends 302 of each pair of main supporting arms 31 close to a second rear end 303 of the auxiliary supporting arm 32 are rotatably coupled to the auxiliary supporting arm 32. A second front end 304 of each auxiliary supporting arm 32 away from the main supporting arm 31 is rotatably coupled to the mounting structure 512 of the first connecting member 51.

Furthermore, in at least one embodiment, the second front end 304 of the auxiliary supporting arm 32 away from the main supporting arms 31 defines a second pivot hole 321. The second front One end 304 of the auxiliary supporting arm 32 away from the main supporting arms 31 extends into the receiving space 5123 formed by the two mounting lugs 5121 of the first connecting member 51. A head screw 36 passes through one first pivot hole 5122, the second pivot hole 321 and the other first pivot hole 5122. The auxiliary supporting arm 32 and the mounting structure 512 are pivotally coupled by the head screw 36.

In actual use, the rotation axes of the main supporting arms 31 and the auxiliary supporting arm 32 all extend along a vertical direction. Therefore, the first adjusting mechanism 30 can adjust the horizontal rotation angle of the display screen.

Furthermore, in at least one embodiment, the rotatable angle of the first adjusting mechanism 30 in the horizontal direction is −180 degrees to +180 degrees.

Furthermore, in at least one embodiment, the connecting frame 11 defines at least two mounting assemblies 110. The first adjusting mechanism 30 includes two pairs of main supporting arms 31 and two auxiliary supporting arms 32 rotatably coupled to the two pairs of main supporting arms 31. The first rear ends 301 of each pair of main supporting arms 31 away from the auxiliary supporting arm 32 are rotatably coupled to two mounting assemblies 110. The second front end 304 of each auxiliary supporting arm 32 away from the main supporting arm 31 is rotatably coupled to the second adjusting mechanism 50.

Furthermore, in at least one embodiment, opposite ends of each main supporting arm 31 define two through holes 311 respectively. Each through hole 311 extends in a direction perpendicular to a length of the main supporting arm 31. The opposite ends of each auxiliary supporting arm 32 define two adapter holes 322 respectively. Each adapter hole 322 extends in a direction perpendicular to the length of the auxiliary supporting arm 32. The first adjusting mechanism 30 also includes four main arm screws 34, two auxiliary arm screws 35, two head screws 36, a number of spacers 38 and a number of nuts 39. The main arm screw 34 is configured to connect the main supporting arm 31 and the connecting frame 11. The auxiliary arm screw 35 is configured to connect the main supporting arm 31 and the corresponding auxiliary supporting arm 32. The head screw 36 is configured to connect the auxiliary supporting arm 32 with the mounting structure 512 of the first connecting member 51 of the second adjusting mechanism 50.

Figure 10:
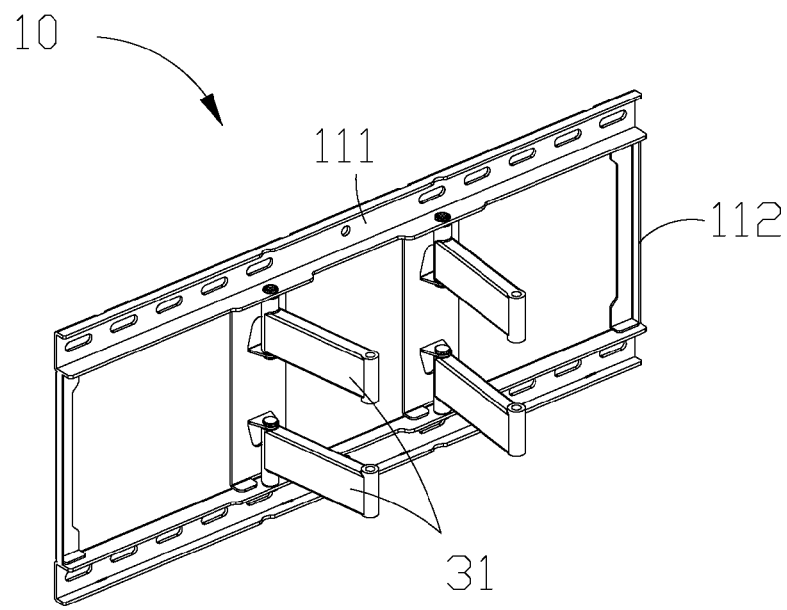
FIG. 10 is a structural schematic diagram of a wall plate of the display mounting apparatus and some components of the first adjusting mechanism provided by one embodiment of the present disclosure.
Figure 11:
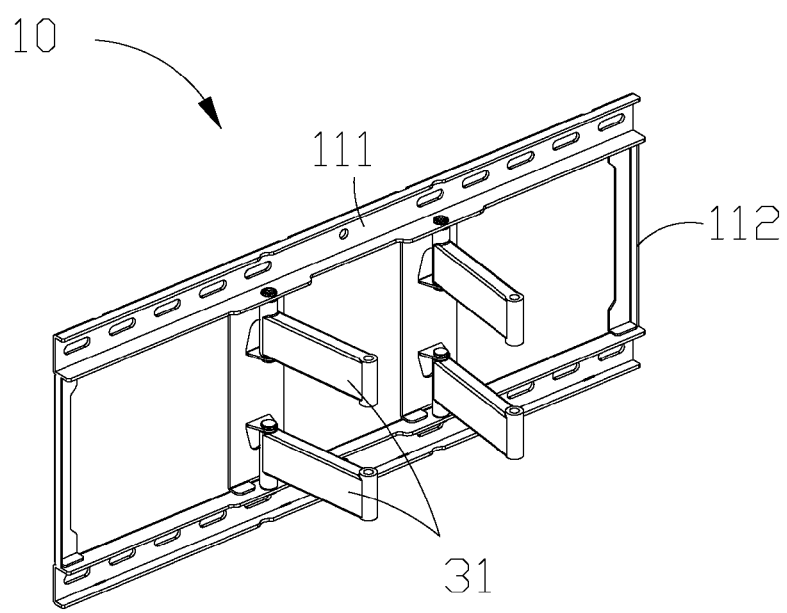
FIG. 11 is an exploded schematic diagram of the wall plate of the display mounting apparatus and some components of the first adjusting mechanism provided by one embodiment of the present disclosure.
Figure 12:
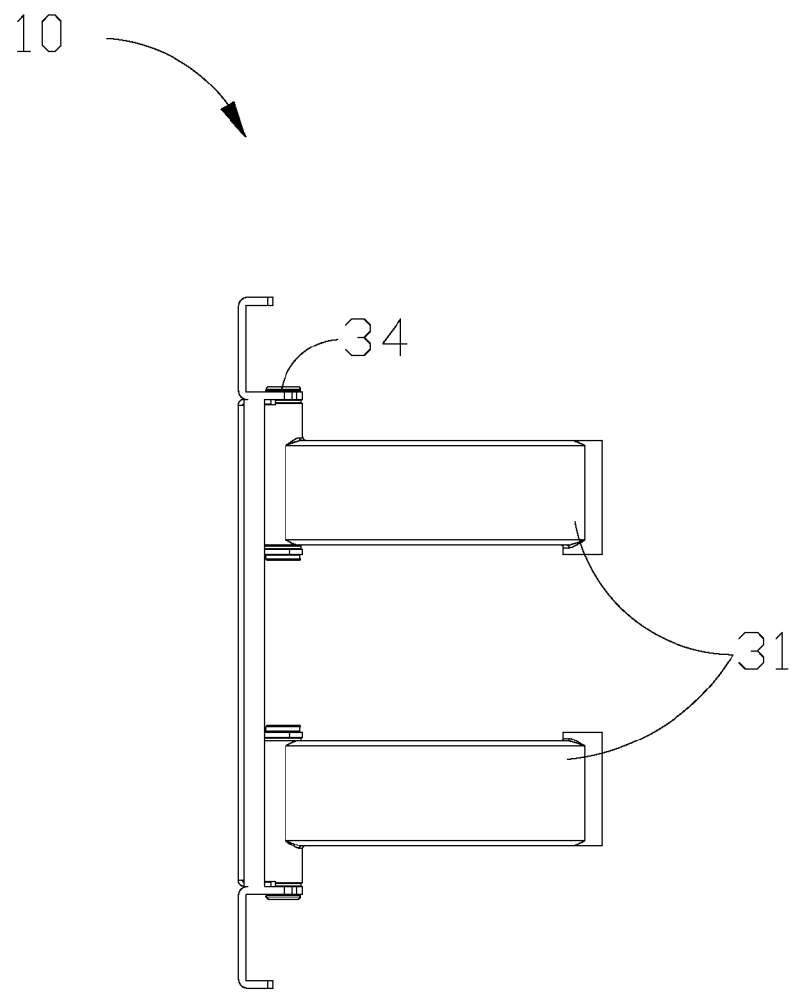
FIG. 12 is a left side view of the wall plate of the display mounting apparatus and some components of the first adjusting structure provided by one embodiment of the present disclosure.
Figure 13:
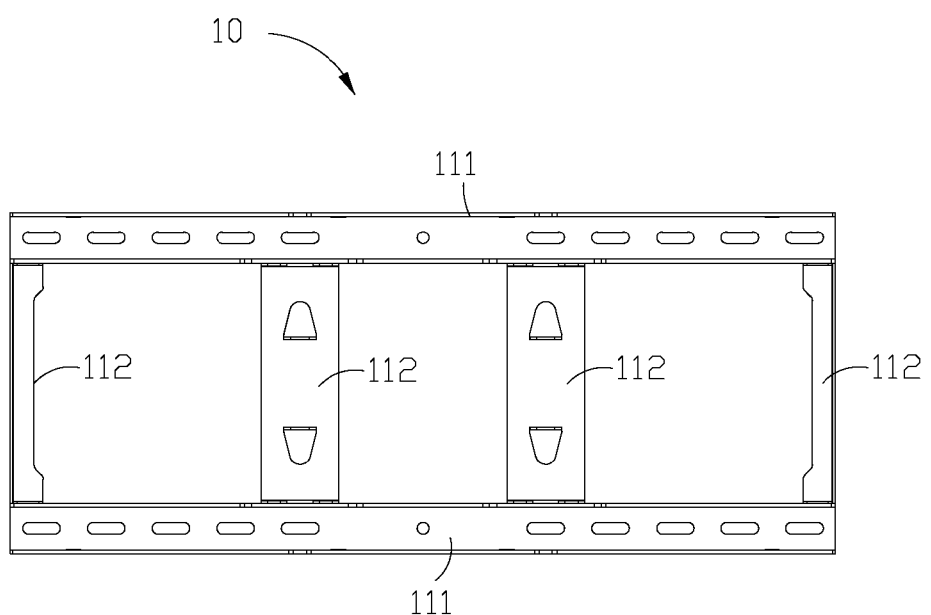
FIG. 13 is a plan view of a connecting frame provided by one embodiment of the present disclosure.

Furthermore, in at least one embodiment, please referring to FIGS. 10 to 12, one side of the connecting frame 11 facing the first adjusting mechanism 30 is provided with the at least one pair of mounting assemblies 110. The at least one pair of mounting assemblies 110 are configured for mounting the first rear ends 301 of the at least one pair of main supporting arms 31 of the first adjusting mechanism 30. In detail, the first rear end 301 of each main supporting arm 31 away from the auxiliary supporting arm 32 is rotatably coupled to one mounting assembly 110 of the first adjusting mechanism 30.

Furthermore, in at least one embodiment, the connecting frame 11 is formed by two horizontal supporting members 111 and at least two vertical supporting members 112. One side of at least one vertical supporting member 112 facing the first adjusting mechanism 30 is provided with at least two horizontal mounting lugs 1121. Each horizontal supporting member 111 is provided with a mounting protruding edge 1111 which is adjacent to a respective one of the mounting lugs 1121. Each mounting lug 1121 and one corresponding mounting protruding edge 1111 are spaced apart in a vertical direction to form the mounting assembly 110.

In this embodiment, the connecting frame 11 is formed by two horizontal supporting members 111 and four vertical supporting members 112. A total of four horizontal mounting lugs 1121 are provided on one side of the two middle vertical supporting members 112 away from the wall. The four mounting lugs 1121 are respectively located at opposite ends of the two vertical supporting members 112. Each mounting lug 1121 is adjacent to one horizontal supporting member 111. Each horizontal supporting member 111 is provided with one mounting protruding edge 1111 which is adjacent to the mounting lug 1121. Each mounting lug 1121 and the corresponding mounting protruding edge 1111 are spaced apart in the vertical direction to form the mounting assembly 110. Therefore, the four mounting lugs 1121 and the corresponding four mounting protruding edge 1111 cooperatively form four mounting assemblies 110. Each mounting assembly 110 is used for connecting with the main supporting arm 31 through the main arm screw 34. In this way, the main supporting arm 31 and the mounting assembly 110 can be relatively rotated, and the movement is stable.

Optionally, in at least one embodiment, when the first adjusting mechanism 30 includes two pairs of main supporting arms 31 and two secondary supporting arms 32. The second adjusting mechanism 50 includes two first connecting members 51, two second connecting members 52, two connecting plates 53 and two adjusting members 54. The mounting walls 531 of the connecting plates 53 are two oppositely arranged. One first connecting member 51, one second connecting member 52, one connecting plate 53 and one adjusting member 54 are arranged on one mounting wall 531.

Optionally, in other embodiments, when the first adjusting mechanism 30 includes a pair of main supporting arms 31 and a secondary supporting arm. The second adjusting mechanism 50 includes a first connecting member 51, a second connecting member 52, a connecting plate 53 and an adjusting member 54. The number of the mounting wall 531 of the connecting plates 53 is one. The mounting wall 531 is protruded vertically from a surface of the plate body 530 close to the first adjusting mechanism 30, and is parallel to the side edges of the plate body 530.

Optionally, in at least one embodiment, when the rotatable angle of the first adjusting mechanism 30 in the horizontal direction is −180 degrees to +180 degrees, when the main supporting arm 31 rotates left or right to reach a limit position, the main supporting arm 31 will directly abut the connecting frame 11, which makes the main supporting arm 31 and the connecting frame 11 collide with each other, and causes vibration to the display screen mounted on the mounting support 70. In addition, the collision between the main supporting arm 31 and the connecting frame 11 will also produce impact noise; the collision between the main supporting arm 31 and the connecting frame 11 will also make the surfaces of the main supporting arm 31 and the connecting frame 11 have a possibility of being damaged. Therefore, the wall plate 10 further includes a buffer member 12. The buffer member 12 is arranged on the vertical supporting member 112 of the connecting frame 11. When the main supporting arm 31 rotates left or right to the limit position, the buffer member 12 can buffer the movement of the main supporting arm 31.

Furthermore, in at least one embodiment, the connecting frame 11 of the wall plate 10 is stamped from metal materials. For example, aluminum alloy, magnesium alloy, titanium alloy, stainless steel, etc. Therefore, the edges of the connecting frame 11 is relatively sharp, which is easy to cut people. In addition, the appearance of the metal connecting frame 11 is not good. Therefore, in order to protect users and for aesthetics, please referring to FIG. 2, the wall plate 10 also includes two plastic covers 13. The two plastic covers 13 cover the upper horizontal supporting member 111 and the lower horizontal supporting member 111 respectively.

Furthermore, in at least one embodiment, in view of the American architectural features, most of the walls are composed of wooden columns, and the spacing between the wooden columns is generally 16-24 inches. Therefore, in the present disclosure, the size of the wall plate 10 is 16-24 inches, which is suitable for a variety of wall installations.

During installation, each mounting assembly 110 and one main supporting arm 31 are riveted by one main arm screw 34. In this way, the each pair of main supporting arms 31 are relatively rotated with the two mounting assemblies 110 respectively. The auxiliary supporting arm 32 is coupled to the two main supporting arms 31 through the auxiliary arm screw 35. The second front end 303 of the auxiliary supporting arm 32 away from the main supporting arm 31 is coupled to the first connecting member 51 through the head screw 36. The first connecting member 51, the second connecting member 52, the connecting plate 53 and the adjusting member 54 are coupled. The mounting frame of the mounting support 70 is coupled to the connecting plate 53. The wall plate 10 is fixed on the wall. The hanging rod 73 is fixed on the back surface of the display screen. The hanging rod 73 is hung on the upper connecting rod 72 through its hook 732. The lower end of the hanging rod 73 is locked on the lower connecting rod 71 through the pipe clamp 74 to complete the installation of the display screen.

When it is necessary to adjust the display angle of the display screen horizontally, the left and right sides of the display screen is held by user to pull the display screen, thereby the display screen is rotated to cause the main supporting arms 31 and the auxiliary supporting arm 32 of the first adjustment structure 30 to move, to achieve to adjust the horizontal display angle of the display screen.

When it is necessary to adjust the display angle of the display screen vertically, the adjusting member 54 is released, the upper and lower sides of the display screen are held by user to pull the display screen, thereby the first connecting member 51 and second connecting member 52 of the second adjusting mechanism 50 are rotated to adjust the vertical display angle of the display screen. After the vertical display angle reaches to the ideal vertical display angle, the adjusting member 54 is tightened again.

Therefore, the present disclosure can adjust the horizontal rotation angle and the vertical rotation angle of the display screen within a certain range, and can use displays on different occasions, and the installation process is simple and the adjustment method is simple.

The above is the implementation of the embodiments of the present disclosure. It should be pointed out that for those of ordinary skill in the art, without departing from the principle of the embodiments of the present disclosure, several improvements and modifications can be made, and these improvements and modifications are also treated as the protection scope of the present disclosure.

What is claimed is:

1. A display mounting apparatus for mounting a display screen on a wall, wherein the display mounting apparatus comprises a wall plate, a first adjusting mechanism, a second adjusting mechanism, and a mounting support; a rear end of the first adjusting mechanism is rotatably coupled to the wall plate; the second adjusting mechanism comprises a first connecting member, a second connecting member, a connecting plate and an adjusting member; a side wall of the first connecting member is rotatably coupled to a front end of the first adjusting mechanism; the connecting plate comprises a mounting wall; a first end of the first connecting member away from the second connecting member and a second end of the second connecting member away from the first connecting member are respectively coupled to the mounting wall; a third end of the first connecting member close to the second connecting member and a fourth end of the second connecting member close to the first connecting member are pivotally coupled; the second connecting member defines a sliding adjustment hole; the second connecting member and the connecting plate are slidably coupled by the adjusting member passing through the sliding adjustment hole and fixed to the mounting wall; the connecting plate is configured to mount the mounting support; and the mounting support is configured to mount the display screen.

2. The display mounting apparatus according to claim 1, wherein the connecting plate further comprises a plate body; the mounting wall is protruded from a side edge of the plate body towards the first adjusting mechanism.

3. The display mounting apparatus according to claim 1, wherein the first connecting member and the second connecting member are arranged on an outside surface of the mounting wall of the connecting plate.

4. The display mounting apparatus according to claim 1, wherein the mounting wall comprises a mounting portion located in a middle thereof; the mounting portion defines a first mounting hole and a second mounting hole; the first mounting hole is located below the second mounting hole; the first mounting hole is configured to pivotally connect the first end of the first connecting member; the adjusting member passes through the sliding adjustment hole and the second mounting hole in sequence, such that the second end of the second connecting member is slidably fixed on the mounting wall.

5. The display mounting apparatus according to claim 4, wherein the sliding adjustment hole extends along a length of the second connecting member; the second connecting member is provided with a non-slip strip along at least one side of the sliding adjustment hole; when the adjusting member passes through the sliding adjustment hole and is fixedly coupled to the mounting wall, a head of the adjusting member abuts on the non-slip strip.

6. The display mounting apparatus according to claim 1, wherein the side wall of the first connecting member is provided with a mounting structure; the front end of the first adjusting mechanism is rotatably mounted on the mounting structure.

7. The display mounting apparatus according to claim 1, wherein the mounting wall comprises a mounting portion located in a middle thereof; the second connecting member is provided with a limiting member; the limiting member is located on the fourth end of the second connecting member, and further located on a first side surface of the second connecting member adjacent to the first adjusting mechanism; the limiting member is capable of resisting on a second side surface of the mounting portion.

8. The display mounting apparatus according to claim 7, wherein a position of the mounting portion corresponding to the limiting member defines an avoiding groove.

9. The display mounting apparatus according to claim 8, wherein a depth of the avoiding groove is positively correlated with a limit value of a downward tilt angle of the display screen.

10. The display mounting apparatus according to claim 1, wherein the mounting wall comprises a first connecting portion and a second connecting portion located at respective ends thereof; the first connecting portion defines a first through hole; the second connecting portion defines a second through hole; and the first through hole and the second through hole are configured for fixing the mounting support.

11. The display mounting apparatus according to claim 10, wherein the mounting support comprises two connecting rods and two supporting members; an upper connecting rod of the two connecting rods passes through the first through hole; a lower connecting rod of the two connecting rods passes through the second through hole, the two connecting rods and the two supporting members are alternately coupled to form a rectangular mounting frame.

12. The display mounting apparatus according to claim 11, wherein the mounting support further comprises two hanging rods and two pipe clamps; each hanging rod defines a hook; each hanging rod is hung on the upper connecting rod of the two connecting rods by using its hook; each pipe clamp locks the corresponding hanging rod on the lower connecting rod of the two connecting rods.

13. The display mounting apparatus according to claim 12, wherein the pipe clamp comprises a clamp body, a third connecting portion and a fourth connecting portion; the third connecting portion and the fourth connecting portion are coupled to opposite ends of the clamp body; the third connecting portion pivotally connects the pipe clamp to a lower end of the hanging rod; the fourth connecting portion of the pipe clamp is detachably locked on the hanging rod.

14. The display mounting apparatus according to claim 1, wherein the wall plate comprises a connecting frame; the first adjusting mechanism comprises at least one pair of main supporting arms and at least one auxiliary supporting arm, and first rear ends of each pair of the main supporting arms are rotatably coupled to the connecting frame; first front ends of each pair of the main supporting arms are rotatably coupled to a second rear end of the auxiliary supporting arm; and a second front end of each auxiliary supporting arm is rotatably coupled to the first connecting member.

15. The display mounting apparatus according to claim 14, wherein one side of the connecting frame facing the first adjusting mechanism is provided with at least one pair of mounting assemblies for mounting the at least one pair of main supporting arms respectively.

16. The display mounting apparatus according to claim 15, wherein the connecting frame is formed by at least two horizontal supporting members and at least two vertical supporting members; one side of at least one of the vertical supporting members facing the first adjusting mechanism is provided with at least two horizontal mounting lugs; each horizontal supporting member is protruded with one mounting protruding edge which is adjacent to a respective one of the mounting lugs, each mounting lug and one corresponding mounting protruding edge are arranged at intervals in a vertical direction to form one of the mounting assemblies.

17. The display mounting apparatus according to claim 14, wherein the wall plate further comprises a buffer member; the buffer member is arranged on the connecting frame; when the main supporting arm rotates left or right to a limit position, the buffer member buffers a movement of the main supporting arm.

18. The display mounting apparatus according to claim 1, wherein the first adjusting mechanism has a rotatable angle in a horizontal direction from −180 degrees to +180 degrees.

19. The display mounting apparatus according to claim 1, wherein the second adjusting mechanism has a rotatable angle in a vertical direction from −20 degrees to +5 degrees.

* * * * *